H. CARVER.
Vegetable Cutter.
No. 8,310.
Patented Aug. 26, 1851.
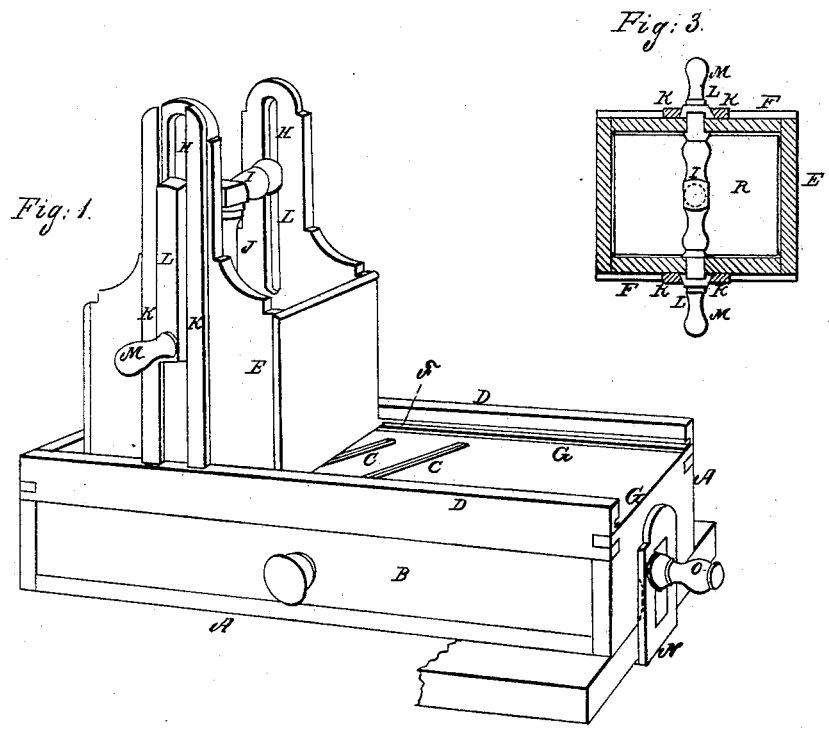
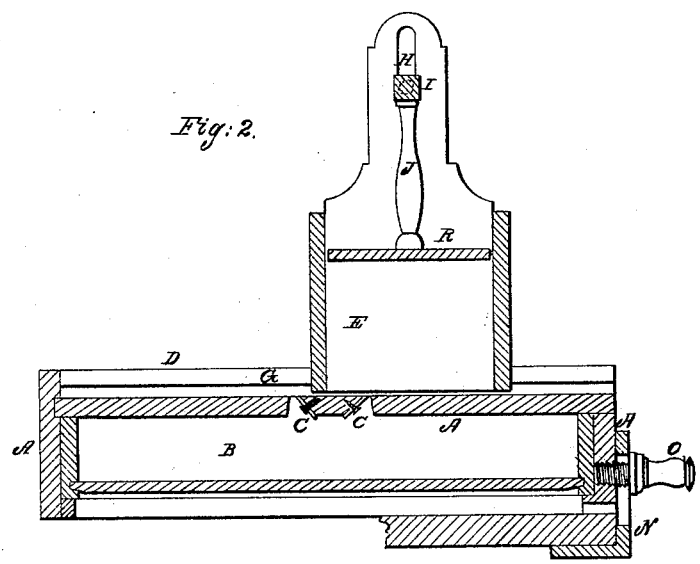

UNITED STATES PATENT OFFICE.

HIRAM CARVER, OF EDINBURGH, VIRGINIA.

CABBAGE-CUTTER.

Specification of Letters Patent No. 8,310, dated August 26, 1851.

*To all whom it may concern:*

Be it known that I, HIRAM CARVER, of Edinburgh, in the county of Shenandoah and State of Virginia, have invented certain new and useful Improvements in the Machine for Mincing Cabbage for Salad; and I do hereby declare the following to be a full and clear description of the construction and operation thereof, reference being had to the accompanying drawings, making part of this specification, in which—

Figure 1 is a perspective view of the machine. Fig. 2 is a vertical longitudinal section, and Fig. 3 is a horizontal section of the reciprocating feeding box.

The same letters of reference on the several figures indicate the same parts.

The nature of my improvement consists in furnishing an oblong box, (provided with two parallel knives secured obliquely in the top thereof with their cutting edges in right and left positions),—with a horizontal reciprocating feeding box provided with a vertical feeder having handles connected therewith by which the operator lays hold and actuates the feeding box over the knives, and at the same time rendering it self-feeding.

This machine is designed for mincing cabbage for salads, and consists of an oblong base box A, provided with a drawer B, and having two parallel oblique openings in the top thereof within which are secured by set screws two steel blades or knives c, c, in such a manner that their cutting edges shall be in right and left positions to each other, and having slots therein to receive the shanks of the screw bolts to admit of their adjustment to regulate the fineness of the material being minced.

The sides and left end of this box are made to project above the top thereof—so as to form sides or ways D, to the reciprocating feeding box E, having a cubical form, open at top and bottom, within which the material to be minced is placed.

The lower edges of the feeding box E, are provided with tongues or ribs F which fit in grooves or channels G, in the projecting sides D, of the oblong base box A by which the reciprocating feeding box is confined and allowed to move in the ways or grooves D, over the knives or blades C without touching the same; said feeding box being removed when required by simply sliding it out at the right end of the oblong box A.

The sides of this reciprocating box E, are extended above the body thereof, about equal to its height and are provided with vertical slots H, to receive the journals of a horizontal transverse bar I, to which the vertical feeder R, is attached by means of a central arm I.

To each side of the feeding box E are secured two vertical cleats K, K, between which are confined two vertical bars L, L, in the upper ends of which the journals of the transverse bar I, are secured; and to their lower ends are attached two handles M, by which the operator lays hold to actuate the feeding box over the blades or knives C, and simultaneously therewith press the vertical feeder R upon the material being minced, and thus render the reciprocating box E, self-feeding with its motion.

When it is desired to operate the machine, the feeding box E, is mounted upon the base oblong box A, and the operator raises the vertical feeder R by the handles M, and turns it upon its journals outward at one side of the box E. The material to be minced is then placed within the box, and the vertical feeder R adjusted to its proper position thereupon, the operator standing at the right end of the machine then lays hold of the handles M, of the vertical bars L, and by a simple motion of his arms moves the feeding box E, back and forth over the parallel oblique blades C, and at the same time feed the material to the knives by the exertion of the operators arms in producing the reciprocating movement, the position of the knives being such as to mince the material on the back and forth movement of the feeding box, the minced material passing through the openings in which the knives are secured, into the receiving drawer B.

It should have been stated that the machine is provided with a right angled clamp N, and clamp screw O, at the right end of the oblong base box by which it is clamped to the table or other place previous to the commencement of the operation as seen in Fig. 1.

This machine is adaptable to the mincing of other vegetables and also fruits, and meats, and is simple, cheap, and convenient, requiring no arrangement of gearing to actuate the same, or feed the material to be minced.

Having thus described my improvement on the machine for mincing cabbage, what I claim therein as new and desire to secure by Letters Patent, is—

The two vertical bars L, L, confined to the sides of the feeding box E, so as to rise and fall with the movement of the feeder R, said vertical bars L L having handles M, by which the operator actuates the feeding box, and by the same exertion of his arms renders the material self-feeding simultaneously with the reciprocating motion of the box E.

In testimony whereof I have hereunto signed my name before two subscribing witnesses.

HIRAM CARVER.

Witnesses:
  WM. P. ELLIOT,
  L. S. SMITH.